United States Patent
Saitoh et al.

(10) Patent No.: US 10,958,196 B2
(45) Date of Patent: Mar. 23, 2021

(54) POWERTRAIN SYSTEM

(71) Applicant: TOYOTA JIDOSHA KABUSHIKI KAISHA, Toyota (JP)

(72) Inventors: Hirotaka Saitoh, Mishima (JP); Shuichi Iwata, Nisshin (JP); Atsushi Hayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/593,158

(22) Filed: Oct. 4, 2019

(65) Prior Publication Data

US 2020/0161997 A1 May 21, 2020

(30) Foreign Application Priority Data

Nov. 21, 2018 (JP) ............................. JP2018-218516

(51) Int. Cl.
| | |
|---|---|
| *H02P 6/14* | (2016.01) |
| *H02P 6/20* | (2016.01) |
| *H02K 47/04* | (2006.01) |
| *H02P 6/10* | (2006.01) |
| *B60L 50/61* | (2019.01) |

(52) U.S. Cl.
CPC ............... *H02P 6/20* (2013.01); *B60L 50/61* (2019.02); *H02K 47/04* (2013.01); *H02P 6/10* (2013.01)

(58) Field of Classification Search
CPC ............ H02P 6/20; B60L 50/61; H02K 47/04

USPC .................................................... 318/400.26
See application file for complete search history.

(56) References Cited

U.S. PATENT DOCUMENTS

| | | | |
|---|---|---|---|
| 9,260,019 B2* | 2/2016 | Sakata | ..................... B60L 50/50 |
| 2002/0158513 A1* | 10/2002 | Amano | ................. B60W 10/06 |
| | | | 307/10.6 |
| 2015/0061569 A1* | 3/2015 | Alexander | .............. H02J 7/022 |
| | | | 320/101 |

FOREIGN PATENT DOCUMENTS

JP 2014-050303 A 3/2014

\* cited by examiner

*Primary Examiner* — Erick D Glass
(74) *Attorney, Agent, or Firm* — Sughrue Mion, PLLC

(57) ABSTRACT

A powertrain system includes an electric motor for driving a vehicle; a battery; an internal combustion engine; an electric generator; a motor inverter connected in parallel to the battery, and converting DC electric power of the battery into AC electric power and supplying it to the electric motor; a generator inverter connected in parallel to the battery, and converting AC electric power generated by the electric generator into DC electric power and supplying it to the battery; and a control device. The control device is configured, where a charging rate of the battery is not greater than a first threshold value, and a ripple current that is generated in association with an operation of the motor inverter and flows into the battery is not less than a second threshold value, not to start up the internal combustion engine for electric power generation using the electric generator.

4 Claims, 6 Drawing Sheets

POWERTRAIN SYSTEM

CROSS-REFERENCE TO RELATED APPLICATION

The present disclosure claims priority under 35 U.S.C. § 119 to Japanese Patent Application No. 2018-218516, filed on Nov. 21, 2018. The content of which is incorporated herein by reference in its entirety.

BACKGROUND

Technical Field

The present disclosure relates to a powertrain system, and more particularly to a powertrain system provided with an electric motor for driving a vehicle, an electric generator for generating an electric power using the power of an internal combustion engine, and a battery connected in parallel to each of the electric motor and the electric generator via the respective inverters.

Background Art

For example, JP 2014-050303 A discloses an electric vehicle provided with an electric motor for vehicle running, a battery, an inverter, a capacitor and a control device. In detail, the battery supplies electric power to the electric motor. The inverter converts direct current (DC) electric power of the battery into alternating current (AC) electric power and supplies the AC electric power to the electric motor. The capacitor is connected between a positive electrode and a negative electrode of an input terminal of the inverter. On that basis, the control device is configured to estimate a ripple current of the capacitor on the basis of an electric current flowing between the inverter and the electric motor, a modulation ratio of the inverter, and an input voltage of the inverter, and also to estimate the amount of heat generated by the capacitor on the basis of the estimated ripple current The "ripple current of the capacitor" mentioned here refers to a ripple current that is generated in association with the operation of switching elements of the inverter to flows into and out of the capacitor.

SUMMARY

A powertrain system is known which includes not only an electric motor configured to drive a vehicle (i.e., an electric motor for vehicle running) but also an electric generator configured to generate an electric power using the power of an internal combustion engine, and a battery connected in parallel to each of the electric motor and the electric generator via the respective inverters (hereunder, also referred to as "motor inverter" and "generator inverter").

In this kind of powertrain system, if the electric generator is operated to charge the battery when the electric motor is driving the vehicle using the electric power of the battery, the following problem may arise. That is to say, a ripple current generated in association with the operation of the motor inverter for controlling the electric motor flows into the battery. In addition, a ripple current generated in association with the operation of the electric generator inverter for controlling the electric generator flows into the battery. Namely, an electric current that is the sum of these ripple currents flows into the battery. There is a concern that, depending on the operating state of the powertrain system, these ripple currents may become excessively large.

The present disclosure has been made in view of the problem described above, and an object of the present disclosure is to provide a powertrain system that includes not only an electric motor configured to drive a vehicle but also an electric generator configured to generate an electric power using the power of an internal combustion engine and a battery connected in parallel to each of the electric motor and the electric generator via the respective inverters, and that can reduce an excessive ripple current flowing into the battery.

A powertrain system according to one aspect of the present disclosure includes: an electric motor configured to drive a vehicle; a battery configured to store an electric power supplied to the electric motor; an internal combustion engine; an electric generator configured to generate an electric power using a power of the internal combustion engine; a motor inverter connected in parallel to the battery, and configured to convert direct current electric power of the battery into alternating current electric power and supply the alternating current electric power to the electric motor; a generator inverter connected in parallel to the battery, and configured to convert alternating current electric power generated by the electric generator into direct current electric power and supply the direct current electric power to the battery; and a control device configured to control the electric motor, the internal combustion engine, the electric generator, the motor inverter and the generator inverter. The control device is configured, where a charging rate of the battery is equal to or lower than a first threshold value, and a ripple current that is generated in association with an operation of the motor inverter and flows into the battery is equal to or greater than a second threshold value, not to start up the internal combustion engine for electric power generation using the electric generator.

A powertrain system according to another aspect of the present disclosure includes: an electric motor configured to drive a vehicle; a battery configured to store an electric power supplied to the electric motor; an internal combustion engine; an electric generator configured to generate an electric power using a power of the internal combustion engine; a motor inverter connected in parallel to the battery, and configured to convert direct current electric power of the battery into alternating current electric power and supply the alternating current electric power to the electric motor; a generator inverter connected in parallel to the battery, and configured to convert alternating current electric power generated by the electric generator into direct current electric power and supply the direct current electric power to the battery; and a control device configured to control the electric motor, the internal combustion engine, the electric generator, the motor inverter and the generator inverter. The control device is configured, if a ripple current that is generated in association with an operation of the motor inverter and flows into the battery becomes equal to or greater than a second threshold value under a condition that the control device causes the internal combustion engine to operate in order to perform an electric power generation using the electric generator when a charging rate of the battery is equal to or lower than a first threshold value and the ripple current is less than the second threshold value, to stop the internal combustion engine.

The control device may be configured, where a rotational speed of the electric motor is within a first designated range and a torque of the electric motor is within a second designated range, to determine that the ripple current is equal to or greater than the second threshold value.

According to the powertrain system of one aspect of the present disclosure, where the charging rate of the battery is equal to or lower than a first threshold value, and the ripple current that is generated in association with an operation of the motor inverter and flows into the battery is equal to or greater than a second threshold value, the internal combustion engine is not started up for electric power generation using the electric generator. As a result, it is possible to reduce an excessive ripple current flowing into the battery due to simultaneous operation of the electric motor and the electric generator.

According to the powertrain system of another aspect of the present disclosure, if the ripple current that is generated in association with an operation of the motor inverter and flows into the battery becomes equal to or greater than a second threshold value under the condition that the control device causes the internal combustion engine to operate in order to perform an electric power generation using the electric generator when the charging rate of the battery is equal to or lower than a first threshold value and the ripple current is less than the second threshold value, the internal combustion engine is stopped. As a result, it is possible to reduce an excessive ripple current flowing into the battery due to simultaneous operation of the electric motor and the electric generator.

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment 1-1. Example of Configuration of Powertrain System

Figure 1:
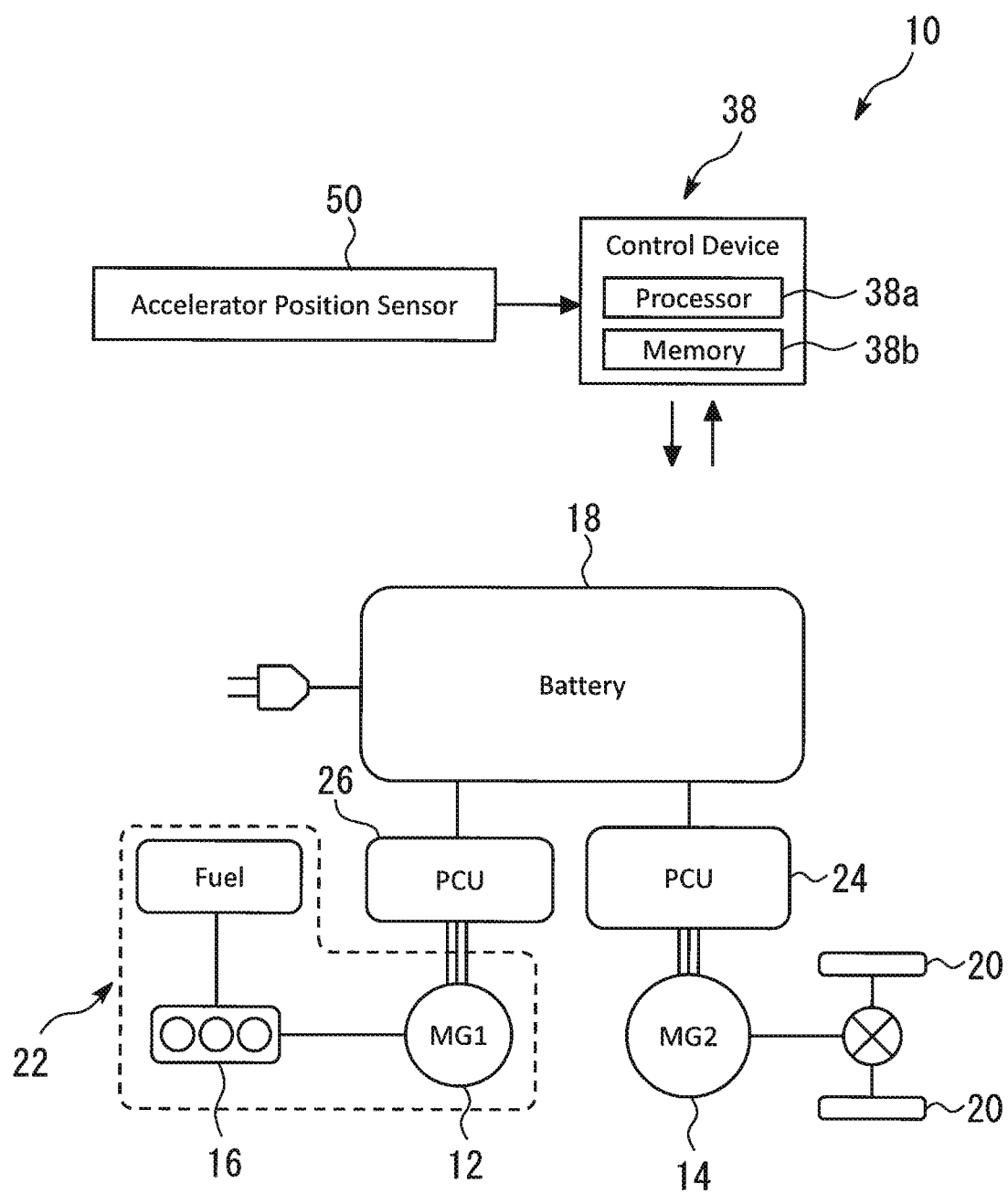
FIG. 1 is a schematic diagram for describing an example of the configuration of a powertrain system according to a first embodiment of the present disclosure.

FIG. 1 is a schematic diagram for describing an example of the configuration of a powertrain system 10 according to the first embodiment of the present disclosure. The powertrain system 10 shown in FIG. 1 is provided with two (first and second) motor generators 12 and 14, an internal combustion engine 16 and a battery 18. Hereunder, the first motor generator 12 is also referred to as "MG1" and the second motor generator 14 is also referred to as "MG2".

The MG2 is used as an electric motor that drives a vehicle (wheels 20) except when regenerative braking is performed at the time of deceleration of the vehicle. Because of this, the MG2 corresponds to an example of the "electric motor" (three-phase AC motor) according to the present disclosure. The battery (DC power supply) 18 stores an electric power supplied to the MG2. In addition, the powertrain system 10 is configured to charge the battery 18 using the electric power supplied from the outside of the vehicle.

On that basis, for the purpose of extending the cruising distance of the vehicle, the powertrain system 10 is provided with a power generation unit 22 configured to generate an electric power supplied to the battery 18. The power generation unit 22 includes the MG1 and the internal combustion engine 16 that are described above. The internal combustion engine 16 receives a supply of fuel to operate. The MG1 is driven by the power of the internal combustion engine 16 to generate an electric power. Because of this, the MG1 corresponds to an example of the "electric generator" (three-phase AC generator) according to the present disclosure.

The vehicle on which the powertrain system 10 having the functions described above is mounted corresponds a so-called REEV (Range Extended Electric Vehicle). In more detail, the power generation unit 22 operates only when electric power generation is required (i.e., the MG1 is driven by the internal combustion engine 16). That is to say, the MG1 and the MG2 are controlled independently of each other.

The powertrain system 10 is also provided with a motor PCU (Power Control Unit) 24 that is a PCU for controlling the MG2 and a generator PCU 26 that is a PCU for controlling the MG1. The motor PCU 24 is equipped with a motor inverter 28 (see FIG. 2) that is an inverter for controlling the MG2, and the generator PCU 26 is equipped with a generator inverter 30 (see FIG. 2) that is an inverter for controlling the MG1. Thus, the powertrain system 10 is, in other words, a two-motor and two-inverter system.

Figure 2:
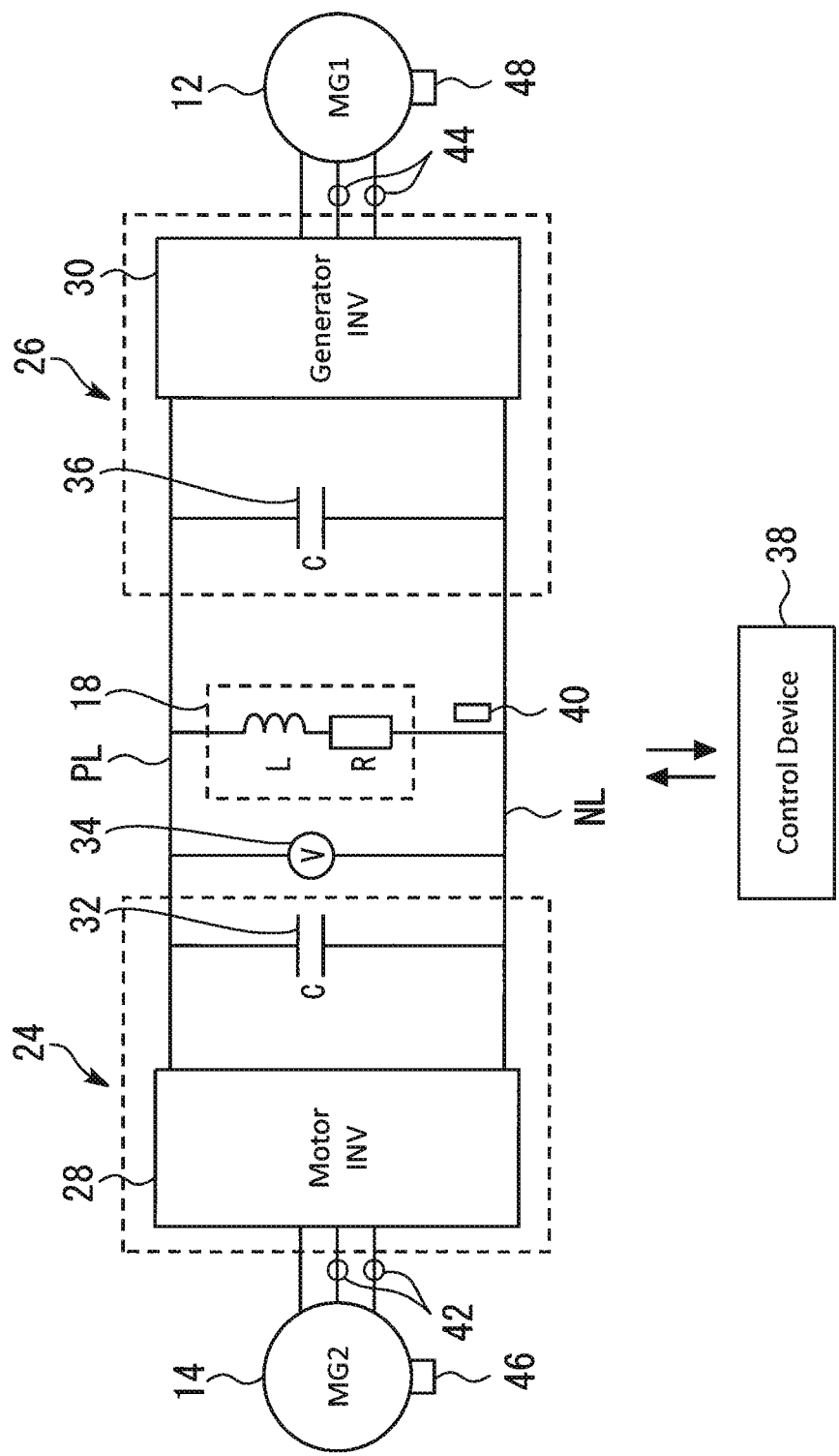
FIG. 2 is a diagram that schematically illustrates a circuit configuration of the powertrain system (two-motor and two-inverter system) shown in FIG. 1.

FIG. 2 is a diagram that schematically illustrates a circuit configuration of the powertrain system 10 (two-motor and two-inverter system) shown in FIG. 1.

The motor PCU 24 is equipped with a capacitor 32 in addition to the motor inverter (motor INV) 28. The motor inverter 28 is connected in parallel to the battery 18. The motor inverter 28 is a power inverter including a plurality of switching elements (not shown). When the vehicle is driven by the MG2, the motor inverter 28 properly turns on and off the individual switching elements in order to convert the direct current (DC) electric power stored in the battery 18 into alternating current (AC) electric power and supply the AC electric power to the MG2. To be more specific, these switching elements are transistors (typically, three pairs of IGBTs (Insulated Gate Bipolar Transistors)), and the on and off is controlled using switching control signals from a control device 38 described below. It should be noted that, when regenerative braking of the vehicle is performed, the motor inverter 28 converts AC electric power generated by the MG2 into DC electric power, and supplies the converted DC electric power to the battery 18 via the capacitor 32.

The capacitor 32 is connected between a power line PL and a ground line NL at the end of the motor inverter 28 located on the side of the battery 18. The capacitor 32 smooths a direct current (DC) electric voltage from the battery 18 and supplies the smoothed DC electric voltage to the motor inverter 28. Moreover, an electric voltage sensor 34 is installed in parallel to the capacitor 32. The electric voltage sensor 34 detects an input voltage of the motor inverter 28 (which is equal to the electric voltage of the battery 18).

The generator PCU 26 is equipped with a capacitor 36 in addition to the generator inverter (generator INV) 30. The generator inverter 30 is connected in parallel to the battery 18. The generator inverter 30 is equipped with a plurality of switching elements (not shown) similarly to the motor inverter 28. The generator inverter 30 properly turns on and off the individual switching elements in order to convert AC electric power generated by the MG1 into DC electric power to supply the DC power to the battery 18.

The capacitor 36 is connected between a power line PI, and a ground line NL at the end of the generator inverter 30 located on the side of the battery 18. The capacitor 36 smooths the DC electric voltage that has been converted by the generator inverter 30 and supplies the smoothed DC electric voltage to the battery 18.

As shown in FIGS. 1 and 2, the powertrain system 10 is further provided with the control device 38. The control device 38 controls the MG2 (electric motor), the power generation unit 22 (the internal combustion engine 16 and the MG1) and the inverters 28 and 30. The control device 38 includes an electronic control unit (ECU) having a processor 38a and a memory 38b. The memory 38b stores programs for controlling the operation of the powertrain system 10. The processor 38a reads out a program from the memory 38b to execute the program. It should be noted that the control device 38 may be configured with a plurality of ECUs.

The control device 38 receives sensor signals from various sensors for controlling the operation of the powertrain system 10. The various sensors mentioned here include electric current sensors 40, 42 and 44, rotation angle sensors (resolvers) 46 and 48 and an accelerator position sensor 50 in addition to the electric voltage sensor 34 described above. The electric current sensor 40 detects an electric current that flows through the battery 18. The electric current sensor 42 detects an electric current that flows through the MG2, and the electric current sensor 44 detects an electric current that flows through the MG1. To be more specific, for example, the electric current sensor 42 detects a V-phase current and a W-phase current of the MG2. The control device 38 estimates the remaining U-phase current on the basis of the detected V-phase and W-phase currents and Kirchhoffs current law. This also applies to the electric current sensor 44. The rotation angle sensor 46 detects the rotation angle of the MG2, and the rotation angle sensor 48 detects the rotation angle of the MG1. The control device 38 can calculate an MG2 rotational speed on the basis of the detected rotation angle of the MG2 and can similarly calculate an MG1 rotational speed. The accelerator position sensor 50 detects the amount of depression of an accelerator pedal of the vehicle.

Furthermore, the control device 38 is configured to calculate a charging rate (SOC: State Of Charge) of the battery 18. More specifically, the SOC corresponds to the ratio (%) of the current charge amount with respect to the full charge amount of the battery 18. Although the manner of obtaining the SOC is not particularly limited, the SOC can be obtained (calculated) by, for example, measuring the electric current flowing into and out the battery 18 using the electric current sensor 40 and integrating the measured electric current with time.

2. Powertrain Control 1-2-1. Basic Operation of Powertrain System

The control device 38 performs software processing in which one or more programs stored in advance are executed by the processor 38a and/or hardware processing using one or more dedicated electronic circuits, and thereby controls the operation of the powertrain system 10. Control modes of the powertrain system 10 by the control device 38 include an "EV mode" and a "cruising range extension mode" that are described below.

(EV Mode)

When the SOC is higher than a threshold value THb (that is, when the amount of charge remaining in the battery 18 is sufficiently great), the control device 38 performs the EV mode in which the vehicle is driven by the MG2. According to the EV mode, the motor inverter 28 is controlled as follows. That is to say, based on an inputted torque command value and information on the electric voltage, the electric current and the rotation angle that are detected by the various sensors described above, the control device 38 controls the motor inverter 28 such that the MG2 outputs a torque (MG2 torque) according to the torque command value. To be more specific, the control device 38 generates the switching control signals for controlling the motor inverter 28 in this way to output the generated switching control signals to the motor inverter 28. As a result, the MG2 torque is controlled so as to satisfy a desired torque command value. It should be noted that the torque command value is determined on the basis of designated parameters, such as the amount of depression of the accelerator pedal detected by the accelerator position sensor 50 and the MG2 rotational speed. In addition, the threshold value THb of the SOC corresponds to an example of the "first threshold value" according to the present disclosure.

(Cruising Range Extension Mode)

When, on the other hand, the SOC becomes lower than or equal to the threshold value THb (that is, when the electric power generation is required to extend the cruising range), the control device 38 performs the cruising range extension mode in which the vehicle is driven by the MG2 while performing the electric power generation using the power generation unit 22. According to the cruising range extension mode, in order to perform the electric power generation using the power generation unit 22, the control device 38 starts up the internal combustion engine 16 and also controls the generator inverter 30 as follows. That is to say, the control device 38 generates the switching control signals for converting, into DC electric power, the AC electric power generated by the MG1 using the power of the internal combustion engine 16 and then outputs the DC electric power to the generator inverter 30. As a result, the generator inverter 30 converts the AC electric power generated by the MG1 into DC electric power, and then supplies the DC electric power to the battery 18.

1-2-2. Issue on Execution of Cruising Range Extension Mode (Simultaneous Execution of MG1 and MG2)

When (the switching elements of) the motor inverter 28 is operated, the electric voltage of the battery 18 fluctuates and, as a result, a ripple current (pulsation component) is superimposed on the direct current that flows between the motor inverter 28 and the battery 18. The battery 18 has an internal resistance, and thus the battery 18 generates heat due to the ripple current flowing into and out the battery 18. In more detail, although a part of the ripple current is smoothed by the capacitor 32, the ripple current that has not been removed by the capacitor 32 flows into the battery 18. In addition, the capacitor 32 also has an internal resistance, and thus the capacitor 32 also generates heat. Hereunder, for convenience of explanation, a ripple current that is superimposed on the electric current that flows into the battery 18 due to the operation of the motor inverter 28 (i.e., switching operation) when the vehicle is driven by the MG2 is referred to as a "ripple current Irmg2 on the MG2 side". It should be noted that this ripple current Irmg2 corresponds to an example of the "ripple current that is generated in association with an operation of the motor inverter and flows into the battery" according to the present disclosure.

With respect to the generator inverter 30, the battery 18 and the capacitor 36, the ripple current as described above is similarly generated. That is to say, when the electric power generation is performed by the MG1 using the power of the internal combustion engine 16, the ripple current is superimposed on the direct current supplied to the battery 18 from the generator inverter 30 due to the switching operation of the generator inverter 30. The battery 18 similarly generates heat due to this ripple current, and the capacitor 36 also generates heat. Hereunder, for convenience of explanation, a ripple current that is superimposed on the electric current that flows into the battery 18 due to the operation of the generator inverter 30 (i.e., switching operation) when the electric power generation is performed by the MG1 is referred to as a "ripple current Irmg1 on the MG1 side".

In the circuit configuration shown in FIG. 2, as described above, the ripple currents are generated both at a portion located between the motor inverter 28 and the battery 18 and at a portion located between the generator inverter 30 and the battery 18. With regard to the ripple currents, in the EV mode, only the ripple current Irmg2 on the MG2 side flows into the battery 18. On the other hand, in the cruising range extension mode, the MG1 is operated simultaneously with the MG2 in order to perform the electric power generation. As a result, the ripple current Irmg2 on the MG2 side and the ripple current Irmg1 on the MG1 side are added to each other in the battery 18. In addition, a ripple current Irs corresponding to the sum of the ripple currents Irmg2 and Irmg1 may be amplified due to the following reason.

As shown in FIG. 2, the battery 18 can be represented using a coil component L, such as bus bars in the battery 18, and a resistance component R (internal resistance). In the circuit configuration shown in FIG. 2, LC resonance may occur on an electric circuit configured between the coil component L of the battery 18 and the capacitor (C) 32. If the frequency of this LC resonance and the carrier frequency of a PWM control by the motor inverter 28 are close to each other, the ripple current Irmg2 on the MG2 side is amplified.

The above also applies to the MG1 side. That is to say, if the frequency of LC resonance on an electric circuit configured between the coil component L of the battery 18 and the capacitor (C) 36 and the carrier frequency of a PWM control by the generator inverter 30 are close to each other, the ripple current Irmg1 on the MG1 side is amplified. In addition, in the circuit configuration shown in FIG. 2, CLC resonance that may occur on an electric circuit configured between the coil component L of the battery 18 and the capacitors (C) 32 and 36. Thus, if the frequency of this CLC resonance and the individual carrier frequencies of the inverters 28 and 30 are close to each other, both of the ripple current Irmg2 on the MG2 side and the ripple current Irmg1 on the MG1 side are amplified.

Figure 3A:
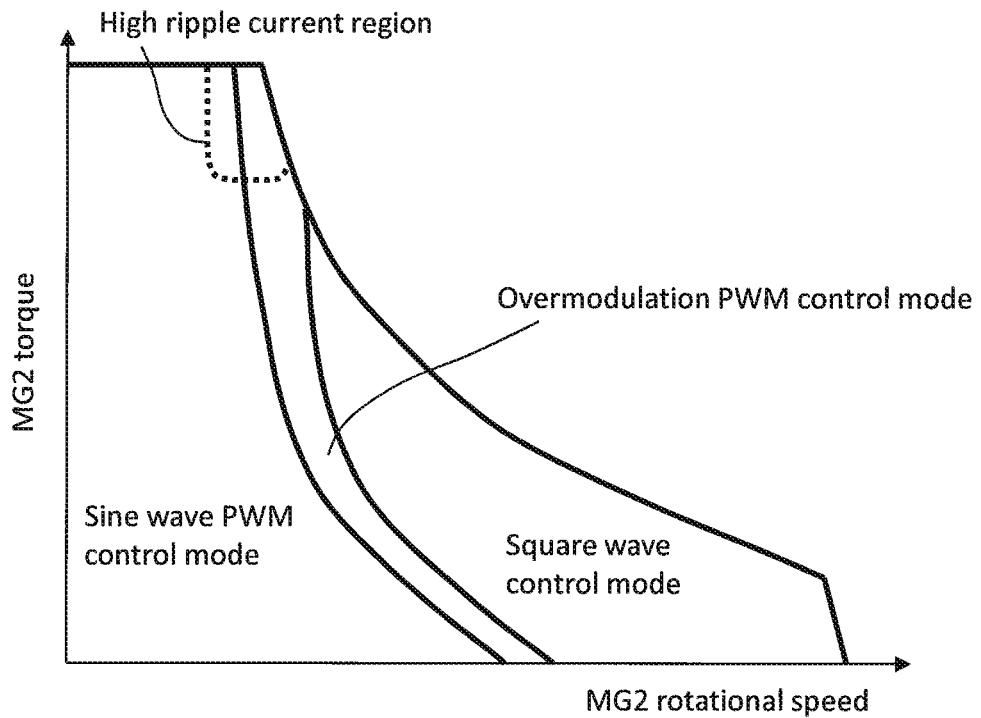
FIG. 3A and FIG. 3B are graphs that illustrate operating regions of an MG2 and an MG1, respectively.
Figure 3B:
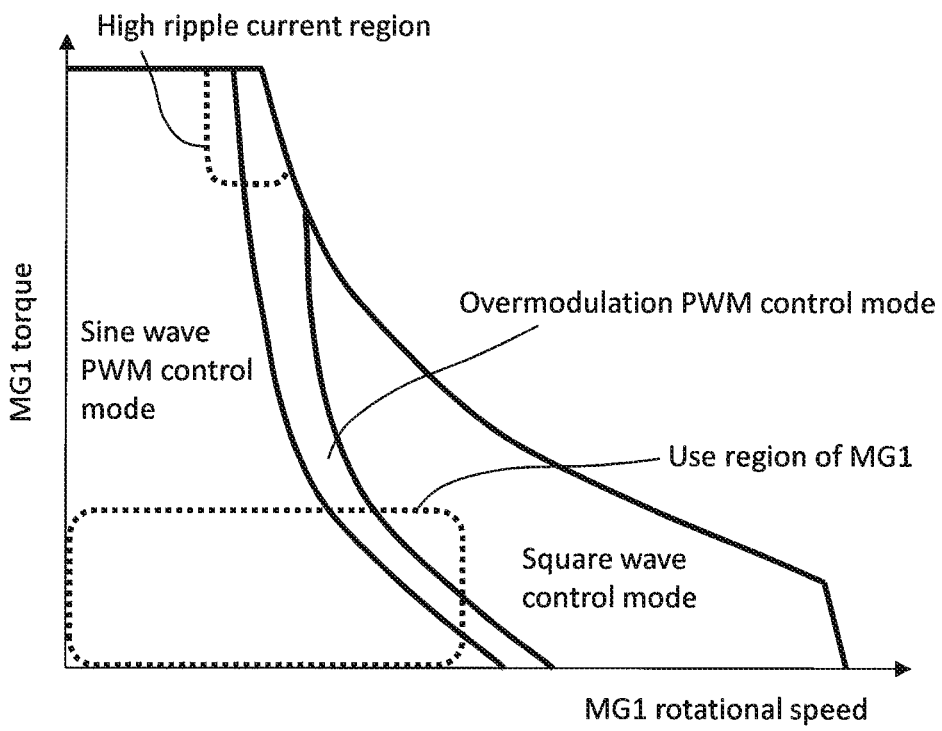

FIG. 3A and FIG. 3B are graphs that illustrate operating regions of the MG2 and the MG1, respectively. More specifically, the control of the MG2 and MG1 using the inverters 28 and 30 is performed by selectively using a sine wave PWM control mode, an overmodulation PWM control mode and a square wave control mode. Since these control modes are well known, the detailed description thereof is herein omitted.

As shown in FIG. 3A, the sine wave PWM control mode is used to reduce torque fluctuations in a region of the MG2 located on the low-speed side. Moreover, in a region of the MG2 located on the high-speed side, the square wave control mode is performed in order to enable the MG2 to produce a high output power. Furthermore, in a region located between these regions, the overmodulation PWM control mode is used. This is to prevent a difference in the MG2 torque from being produced as a result of directly switching the control modes between the sine wave PWM control mode and the square wave control mode. The same also applies to the operating regions of the MG1 as shown in FIG. 3B. It should be noted that the MG2 torque shown in FIG. 3A corresponds to a drive torque which is exerted when the MG2 drives the vehicle, and the MG1 torque shown in FIG. 3B corresponds to a power generation torque which is exerted when the MG1 performs an electric power generation using the power of the internal combustion engine 16.

As shown in FIGS. 3A and 3B, each of the ripple current Irmg2 on the MG2 side and the ripple current Irmg1 on the MG1 side becomes excessively large in a region located on the high-torque side (i.e., high-MG2-current side) in which the square wave control mode or the overmodulation PWM control mode is used. The MG2 comprehensively uses the operating region shown in FIG. 3A in order to satisfy a required driving force of the vehicle from the driver. As a result, during use of the EV mode, a high ripple current region indicated in FIG. 3A may be used. On the other hand, one or a plurality of operating points in a use region (broken line) located on the low-speed and low-torque side as shown in FIG. 3B correspond to one or more operating points of the MG1 used for the electric power generation. This is because the operating points of the internal combustion engine 16 are determined in consideration of low fuel consumption and noise reduction. Because of this, with regard to the MG1, the high ripple current region indicated in FIG. 3A is not used.

Figure 4A:
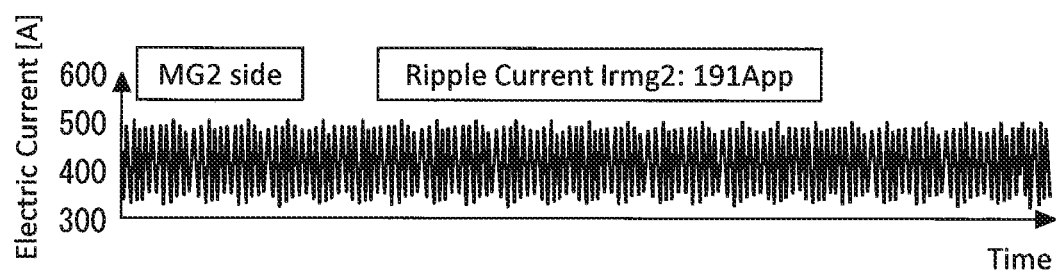
FIG. 4A and FIG. 4B are time charts that illustrate respective examples of a ripple current Irmg2 on the MG2 side and a ripple current Irmg1 on the MG1 side, respectively.
Figure 4B:
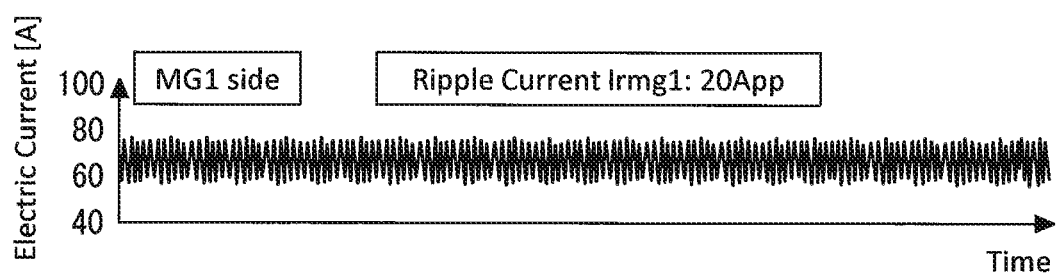

FIG. 4A and FIG. 4B are time charts that illustrate the respective examples of the ripple current Irmg2 on the MG2 side and the ripple current Irmg1 on the MG1 side, respectively. To be more specific, FIG. 4A represents an example of an electric current waveform on which the ripple current Irmg2 is superimposed when the MG2 is operated at an operating point in the high ripple current region shown in FIG. 3A.

The value of the ripple current Irmg2 in the example shown in FIG. 4A is 191App (peak-to-peak value). On the other hand, FIG. 4B represents an example of an electric current waveform on which the ripple current Irmg1 is superimposed when the MG1 is operated at an operating point in the designated use region shown in FIG. 3B. The value of the ripple current Irmg1 in the example shown in FIG. 4B is 20App. As shown in these examples, the ripple current Irmg2 generated when the MG2 is operated at an operating point in the high ripple current region becomes greater than the ripple current Irmg1 generated when the MG1 is operated in order to perform the electric power generation.

Even where the ripple current Irmg2 on the MG2 side and the ripple current Irmg1 on the MG1 side are added to each other, if the ripple current Irs itself is small, the effect of this on the battery 18 and the capacitors 32 and 36 is low. However, there is a concern that, where the electric power generation is started when the MG2 is used in the high ripple current region (i.e., where the switching from the EV mode to the cruising range extension mode is performed), the combined ripple current Irs may become excessively large due to the amplification which is caused as described above.

1-2-3. Features of Powertrain Control According to First Embodiment

In view of the issue described above, according to the present embodiment, the control device 38 is configured, where the SOC of the battery 18 is lower than or equal to the threshold value THb described above and the ripple current Irmg2 on the MG2 side is greater than or equal to a threshold value THp, not to start up the internal combustion engine 16 for the electric power generation using the MG1. It should be noted that the threshold value THp of the ripple current Irmg2 corresponds to an example of the "second threshold value" according to the present disclosure.

In detail, according to the present embodiment, whether the ripple current Irmg2 on the MG2 side is equal to or greater than the threshold value THp is determined, as an example, on the basis of whether or not the MG2 rotational speed is within a first designated range R1 and the MG2 torque is within a second designated range R2.

1-2-4. Processing by Control Device

Figure 5:
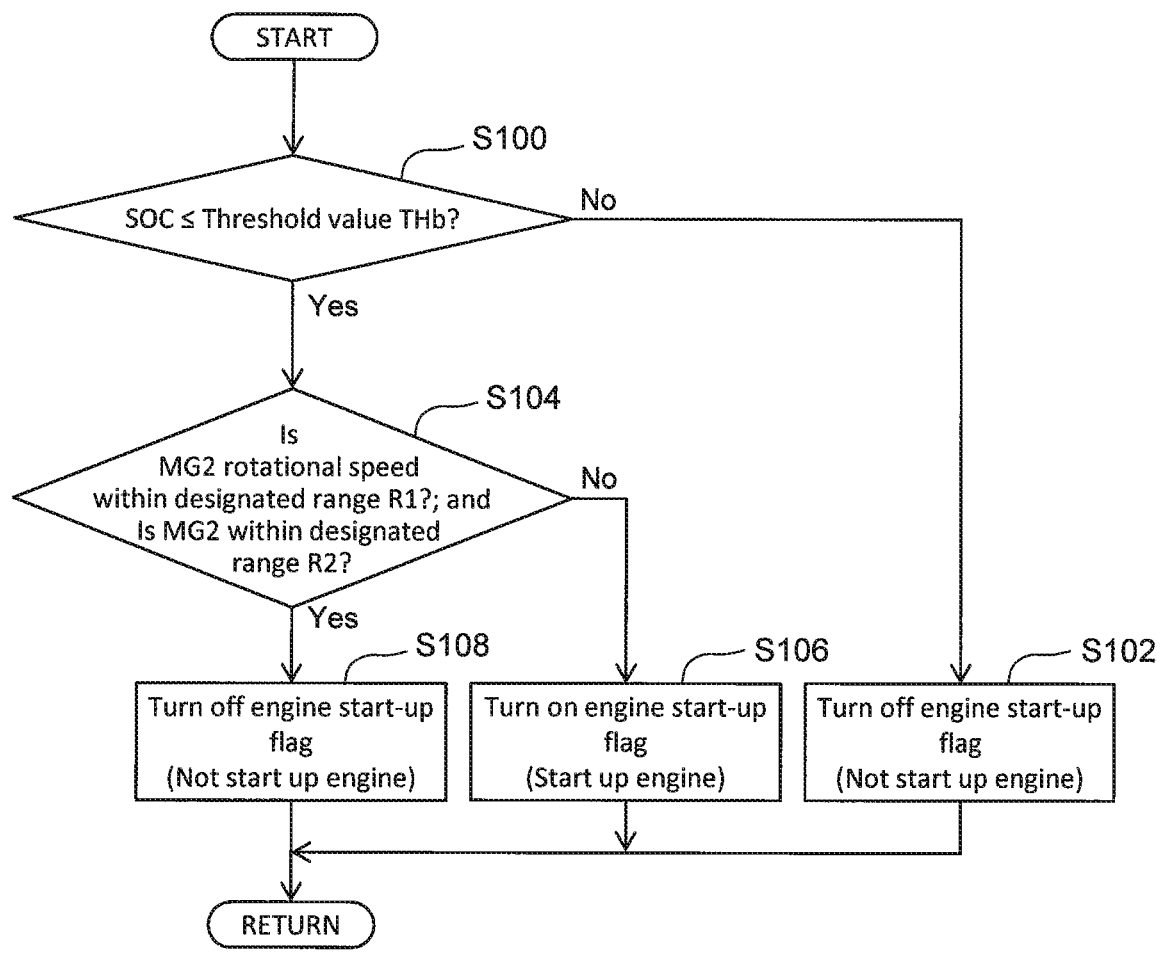
FIG. 5 is a flow chart that illustrates a routine of the processing related to a powertrain control according to the first embodiment of the present disclosure.

FIG. 5 is a flow chart that illustrates a routine of the processing related to the powertrain control according to the first embodiment of the present disclosure. The processing of the present routine is repeatedly executed during the use of the EV mode.

According to the routine shown in FIG. 5, first, the control device 38 determines in step S100 whether the SOC of the battery 18 is equal to or lower than the threshold value THb. The threshold value THb is determined in advance as a value for judging whether or not the SOC has decreased to a level at which the power generation using the electric power generation unit 22 is required during the use of the EV mode.

If the determination result of step S100 is negative (SOC>Threshold value THb), that is, if it can be judged that the electric power generation using the power generation unit 22 is not required, the processing proceeds to step S102. In step S102, the control device 38 leaves an engine start-up flag off which is turned on when the internal combustion engine 16 should be started up. As a result, the internal combustion engine 16 is not started up.

If, on the other hand, the determination result of step S100 is positive (SOC≤Threshold value THb), that is, if it can be judged that the electric power generation is required to extend the cruising range, the processing proceeds to step S104.

In step S104, the control device 38 determines whether or not the MG2 rotational speed is within the first designated range R1 and the MG2 torque is within the second designated range R2. These designated ranges R1 and R2 are determined in advance such that an operating region of the MG2 (for example, the high ripple current region shown in FIG. 3A) in which the ripple current Irmg2 on the MG2 side becomes greater than or equal to the threshold value THp can be specified. In addition, the threshold value THp of the ripple current Irmg2 corresponds to a minimum value of such a ripple current Irmg2 that, if the ripple current Irmg1 on the MG1 side is generated in association with the start of the electric power generation, the ripple current Irs flowing into the battery 18 is caused to increase to a designated allowable value or more due to the overlapping of the ripple currents Irmg2 and Irmg1.

The MG2 torque can be obtained, for example, in the following manner. That is to say, the MG2 torque can be estimated on the basis of the value of the electric current that flows into the MG2. To be more specific, the control device 38 converts, using a three-phase/dq-axis converter (not shown), three-phase electric current values of the MG2 obtained by the use of the electric current sensor 40 into a d-axis current value and a q-axis current value. The memory 38b of the control device 38 stores a map (not shown) that defines a relationship of the MG2 torque with respect to the d-axis current value and the q-axis current value. The control device 38 obtains an MG2 torque according to the d-axis current value and the q-axis current value from this kind of map.

If the determination result of step S104 is negative, that is, if it is estimated that the ripple current Irmg2 is smaller than the threshold value THp, the processing proceeds to step S106. In step S106, the control device 38 turns on the engine start-up flag. As a result, the internal combustion engine 16 is started-up. In other words, if this determination is negative, it can be judged that, even if the electric power generation is started, the ripple current Irs is a small value that is less than the allowable value described above. Thus, the start-up of the internal combustion engine 16 for performing the electric power generation is permitted.

If, on the other hand, the determination result of step S104 is positive, that is, if it is estimated that the ripple current Irmg2 is greater than or equal to the threshold value THp, the processing proceeds to step S108. In step S108, the control device 38 leaves the engine start-up flag off. Because of this, the internal combustion engine 16 is not started up, although the electric power generation is required (SOC≤Threshold value THb).

1-3. Advantageous Effects

According to the powertrain system 10 of the first embodiment described so far, where the ripple current Irmg2 on the MG2 side becomes greater than or equal to the threshold value THp, the internal combustion engine 16 is not started up even when the electric power generation is required (SOC≤Threshold value THb). According to this kind of control, where there is a concern that the ripple current Irs that flows into the battery 18 may become excessive due to the fact that the ripple current Irmg1 on the MG1 side is added to the ripple current Irmg2 and amplified, the electric power generation is no longer performed. Because of this, an excessive increase in the ripple current Irs can be reduced.

In addition to the above, as another measure against the excessive increase in the ripple current Irs that flows into the battery 18, the capacitance of the capacitor 32 for smoothing the ripple current Irmg2 may be increased. However, increasing the capacitance of the capacitor 32 may lead to an increase in cost. Furthermore, as still another measure, the carrier frequency of the PWM control may be increased in order to reduce the ripple current Irmg2 by reducing fluctuations in the electric voltage of the battery 18 due to the operation (switching operation) of the motor inverter 28. However, if the carrier frequency is increased, it is necessary to improve the heat resistance of the switching elements, thus resulting in an increase in cost. In contrast to this, according to the powertrain control of the present embodiment, the excessive increase in the ripple current Irs due to the overlap of the ripple currents Irmg2 and Irmg1 can be reduced without causing an increase in the cost described above.

Moreover, according to the present embodiment, whether or not the ripple current Irmg2 on the MG2 side is greater than or equal to the threshold value THp is determined on the basis of whether or not the MG2 rotational speed is within the first designated range R1 and the MG2 torque is within the second designated range R2. That is to say, according to this kind of manner, the magnitude of the ripple current Irmg2 can be estimated on the basis of the determination result of the operating region of the MG2.

In addition to the above, instead of the example of estimation of the ripple current Irmg2 as described above, the ripple current Irmg2 may be detected by the use of an electric current sensor and it may be determined whether or not the detected ripple current Irmg2 is greater than or equal to the threshold value THp, as described below. However, in order for the control device 38 to receive, from the electric current sensor, the ripple current Irmg2 that fluctuates with a small cycle, it may be required to increase a sampling rate of the control device 38 (ECU). Increasing the sampling rate leads to an increase in the cost of the ECU. In contrast to this, according to the manner of the present embodiment in which the magnitude of the ripple current Irmg2 is estimated using the operating region of the MG2, the ripple current Irmg2 can be obtained without causing this kind of cost increase.

2. Second Embodiment

Then, a second embodiment according to the present disclosure will be described with reference to FIG. 6. In the following explanation, it is assumed that the configuration shown in FIG. 1 is used as an example of the hardware configuration of a powertrain system according to the second embodiment.

2-1. Powertrain Control

2-1-1. Features of Powertrain Control According to Second Embodiment

In the first embodiment, an example has been described in which it is determined whether the control device 38 starts up the internal combustion engine 16 or not in accordance with the magnitude of the ripple current Irmg2 on the MG2 side when a request to start the electric power generation is issued while the internal combustion engine 16 is not started up (SOC≤Threshold value THb). On the other hand, there is the possibility that, even after the electric power generation is started, the ripple current Irmg2 may increase due to a change of the operating point of the MG2 identified by the MG2 torque and MG2 rotational speed, and as a result, the ripple current Irs that flows into the battery 18 from both of the MG2 side and the MG1 side may become excessively large.

Accordingly, in the present embodiment, the control device 38 is configured, if the ripple current Irmg2 becomes equal to or greater than the threshold value THp under the condition that the internal combustion engine 16 is operated in order to perform the electric power generation using the MG1 when the SOC is equal to or lower than the threshold value THb and the ripple current Irmg2 is less than the threshold value THp, to stop the internal combustion engine 16.

2-1-2. Processing by Control Device

Figure 6:
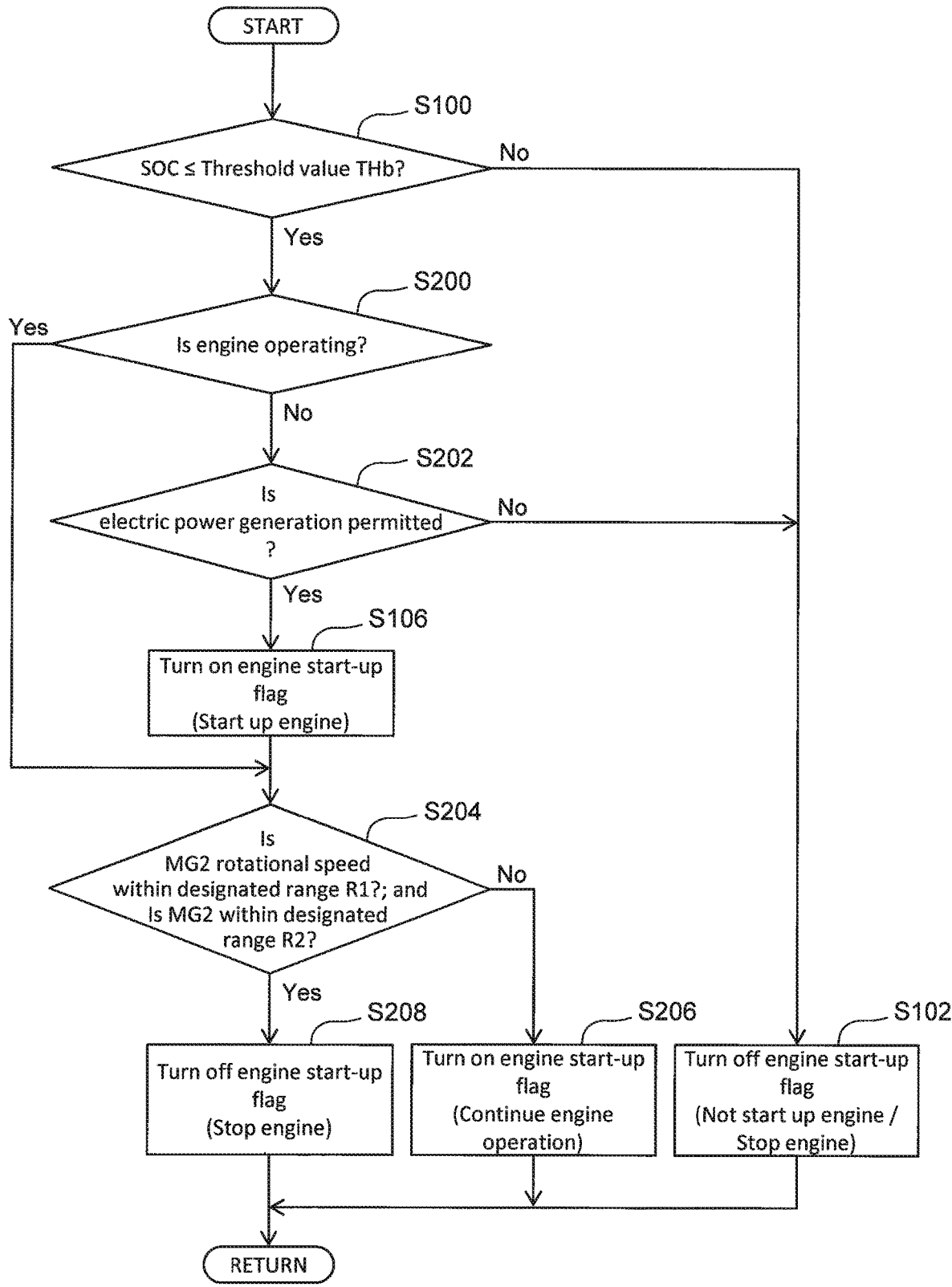
FIG. 6 is a flow chart that illustrates a routine of the processing related to a powertrain control according to a second embodiment of the present disclosure.

FIG. 6 is a flow chart that illustrates a routine of the processing related to the powertrain control according to the second embodiment of the present disclosure. The processing of the present routine is repeatedly executed during operation of the powertrain system 10. The processing of steps S100, S102 and S106 in the routine shown in FIG. 6 is as already described in the first embodiment.

According to the routine shown in FIG. 6, if the determination result of step S100 is positive, (SOC≤Threshold value THb), the processing proceeds to step S200. It should be noted that, if the determination result of step S100 becomes negative (SOC>Threshold value THb) under the condition that the operation of the internal combustion engine 16 is performed for the electric power generation, the processing proceeds to step S102 and the operation of the internal combustion engine 16 is stopped.

In step S200, the control device 38 determines whether or not the internal combustion engine 16 is operating. If, as a result, the determination result of step S200 is negative (that is, if the internal combustion engine 16 is not operating), the processing proceeds to step S202. If, on the other hand, this determination result is positive (that is, if the internal combustion engine 16 is operating), the processing proceeds to step S204.

In step S202, the control device 38 determines whether the electric power generation is permitted or not. In detail, in this step S202, it is determined whether the electric power generation is permitted or not on the basis of, for example, whether a failure has not occurred in the internal combustion engine 16 and whether the determination condition of step S104 of the routine shown in FIG. 5 is satisfied. It should be noted that whether or not there is a failure of the internal combustion engine 16 can be judged by confirming that none of malfunction indicator lamps (MILs) that indicate failures of the internal combustion engine 16 is turned on.

If the determination result of step S202 is negative (that is, if the electric power generation is not permitted), the processing proceeds to step S102. If, on the other hand, this determination result is positive (that is, if the electric power generation is permitted), the processing proceeds to step S106 and the internal combustion engine 16 is started up. Thereafter, the processing proceeds to step S204.

In step S204, the control device 38 determines whether or not the MG2 rotational speed is within the first designated range R1 and the MG2 torque is within the second designated range R2, similarly to the processing of step S104. As a result, if this determination result is negative, that is, if it is estimated that the ripple current Irmg2 on the MG2 side is smaller than the threshold value THp, the processing proceeds to step S206. In step S206, the control device 38 leaves the engine start-up flag on. That is to say, if it can be judged that the ripple current Irs that flows into the battery 18 when the electric power generation is performed is a small value less than the allowable value described above, the operation of the internal combustion engine 16 is continued.

If, on the other hand, the determination result of step S204 is positive, that is, if it is estimated that the ripple current Irmg2 is greater than or equal to the threshold value THp, the processing proceeds to step S208. In step S208, the control device 38 turns off the engine start-up flag. As a result, the operation of the internal combustion engine 16 is stopped.

2-2. Advantageous Effects

According to the powertrain system of the second embodiment described so far, if the ripple current Irmg2 on the MG2 side becomes greater than or equal to the threshold value THp even under the condition that the internal combustion engine 16 is caused to operate in order to perform the electric power generation using the MG1, the internal combustion engine 16 is forcibly stopped. According to this kind of control, even if the ripple current Irmg2 increases due to a change in the operating point of the MG2 after the start of the electric power generation, the ripple current Irs that flows into the battery 18 from both of the MG2 side and the MG1 side can be prevented from becoming excessively large.

2-3. Modification Example with Respect to Second Embodiment

According to the processing of the routine shown in FIG. 6 of the second embodiment described above, where the internal combustion engine 16 is not started up for the electric power generation, whether the control device 38 starts up the internal combustion engine 16 or not is determined in accordance with the magnitude of the ripple current Irmg2 on the MG2 side using the processing of steps S100, S102, S200 and S202, in the same manner as the processing of the routine shown in FIG. 5 in the first embodiment. In addition, according to the processing of the routine shown in FIG. 6 of the present embodiment, where the internal combustion engine 16 is caused to operate, whether the control device 38 stops the operation of the internal combustion engine 16 or not is determined in accordance with the magnitude of the ripple current Irmg2 using the processing of steps S204 to S208. However, the processing of a routine executed by a control device according to the present disclosure may be modified such that only the latter example (i.e., the example in which whether the control device 38 stops the operation of the internal combustion engine 16 or not is determined in accordance with the magnitude of the ripple current Irmg2 using the processing of steps S204 to S208) is performed.

3. Other Embodiments 3-1. Another Example of determination of Magnitude of Ripple Current Irmg2 on MG2 Side According to the first and second embodiments described above, it is determined whether or not the ripple current Irmg2 is greater than or equal to the threshold value THp on the basis of whether or not the operating point (torque and rotational speed) of the MG2 is within the designated ranges R1 and R2. However, instead of the example described above, the determination on whether or not "a ripple current that is generated in association with an operation of the motor inverter and flows into the battery" is greater than or equal to the "second threshold value" may be performed, for example, by detecting the ripple current using an electric current sensor and determining whether or not the detected ripple current is greater than or equal to the second threshold value.

3-2. Another Example of Circuit Configuration

According to the first and second embodiments described above, the circuit configuration shown in FIG. 2 is used as an example of a circuit configuration including an "electric motor", a "battery", an "electric generator", a "motor inverter" and a "generator inverter" according to the present disclosure. However, the following circuit configuration, for example, may be adopted instead of the circuit configuration shown in FIG. 2. That is to say, this circuit configuration may include a circuit A in which the capacitor 32 and a battery A are connected in parallel with respect to the motor inverter 28 connected with the MG2, and a circuit B in which the capacitor 36 and a battery B are connected in parallel with respect to the generator inverter 30 connected with the MG1. On that basis, the circuit A and the circuit B may be connected such that the battery A and the battery B are connected in parallel to each other. It should be noted that a set of the batteries A and B corresponds to another example of the "battery" according to the present disclosure.

3-3. Other Examples of Vehicle on Which Powertrain System is Mounted

In the first and second embodiments, an example of the REE on which the powertrain system 10 is mounted has been described. However, instead of the REEV described above, the powertrain system according to the present disclosure may be broadly applied to other types of vehicles, as long as it includes a circuit configuration in which a motor inverter for controlling an electric motor and a generator inverter for controlling an electric generator are connected in parallel to the respective batteries.

In detail, the present powertrain system may be applied to, for example, a series hybrid vehicle that does not have a function of charging a battery with an electric power supplied from the outside of the vehicle in contrast to the REEV. In addition, the "internal combustion engine" according to the present disclosure may not always be provided in order to only perform an electric power generation, and the powertrain system according to the present disclosure may thus be applied to other types (for example, torque-split type) of hybrid vehicles in which the internal combustion engine is used to perform an electric power generation and also drive the vehicle.

The embodiments and modification examples described above may be combined in other ways than those explicitly described above as required and may be modified in various ways without departing from the scope of the present disclosure.

What is claimed is:

1. A powertrain system, comprising:
   an electric motor configured to drive a vehicle;
   a battery configured to store an electric power supplied to the electric motor;
   an internal combustion engine;
   an electric generator configured to generate an electric power using a power of the internal combustion engine;
   a motor inverter connected in parallel to the battery, and configured to convert direct current electric power of the battery into alternating current electric power and supply the alternating current electric power to the electric motor;
   a generator inverter connected in parallel to the battery, and configured to convert alternating current electric power generated by the electric generator into direct current electric power and supply the direct current electric power to the battery; and
   a control device configured to control the electric motor, the internal combustion engine, the electric generator, the motor inverter and the generator inverter,
   wherein the control device is configured, where a charging rate of the battery is equal to or lower than a first threshold value, and a ripple current that is generated in association with an operation of the motor inverter and flows into the battery is equal to or greater than a second threshold value, not to start up the internal combustion engine for electric power generation using the electric generator.

2. A powertrain system, comprising:
   an electric motor configured to drive a vehicle;
   a battery configured to store an electric power supplied to the electric motor;
   an internal combustion engine;
   an electric generator configured to generate an electric power using a power of the internal combustion engine;

a motor inverter connected in parallel to the battery, and configured to convert direct current electric power of the battery into alternating current electric power and supply the alternating current electric power to the electric motor;

a generator inverter connected in parallel to the battery, and configured to convert alternating current electric power generated by the electric generator into direct current electric power and supply the direct current electric power to the battery; and a control device configured to control the electric motor, the internal combustion engine, the electric generator, the motor inverter and the generator inverter, wherein the control device is configured, if a ripple current that is generated in association with an operation of the motor inverter and flows into the battery becomes equal to or greater than a second threshold value under a condition that the control device causes the internal combustion engine to operate in order to perform an electric power generation using the electric generator when a charging rate of the battery is equal to or lower than a first threshold value and the ripple current is less than the second threshold value, to stop the internal combustion engine.

3. The powertrain system according to claim 1, wherein the control device is configured, where a rotational speed of the electric motor is within a first designated range and a torque of the electric motor is within a second designated range, to determine that the ripple current is equal to or greater than the second threshold value.

4. The powertrain system according to claim 2, wherein the control device is configured, where a rotational speed of the electric motor is within a first designated range and a torque of the electric motor is within a second designated range, to determine that the ripple current is equal to or greater than the second threshold value.

* * * * *